Feb. 10, 1970         G. REVESZ ETAL         3,495,090
CAMBER ANALYZER USING PHOTOCELL SCANNING A PLURALITY
OF SUCCESSIVE LIGHT SOURCES

Filed March 6, 1968         4 Sheets-Sheet 1

INVENTOR.
GEORGE REVESZ
ALBERT WURZ
BY

ATTORNEY

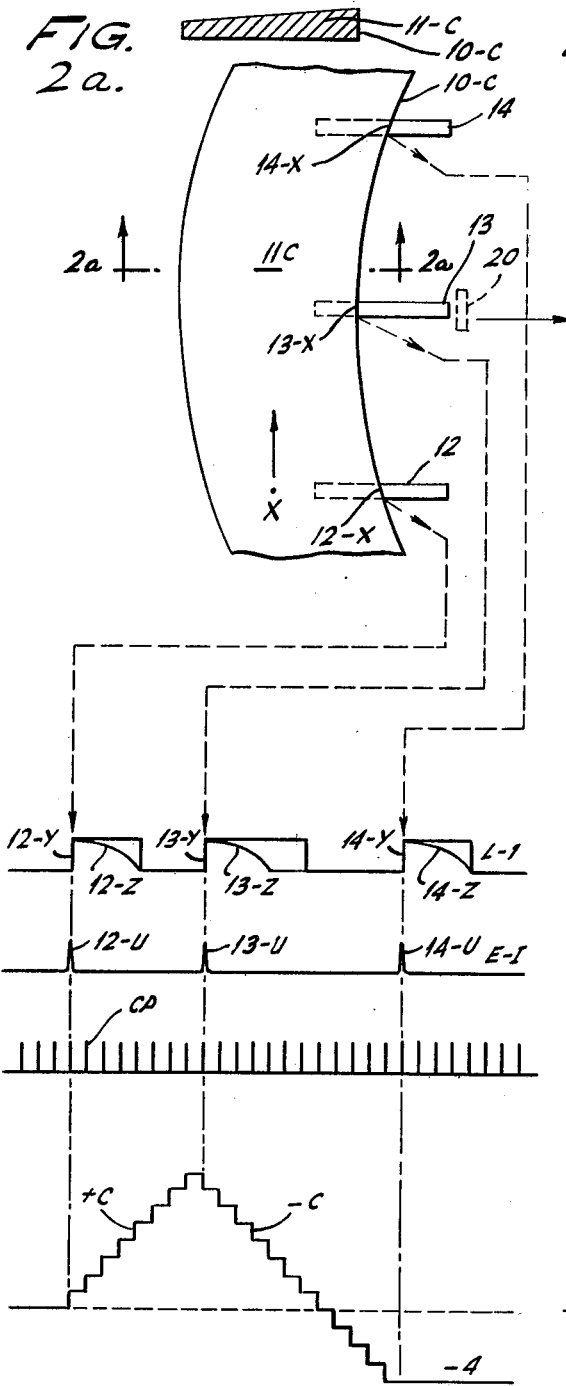
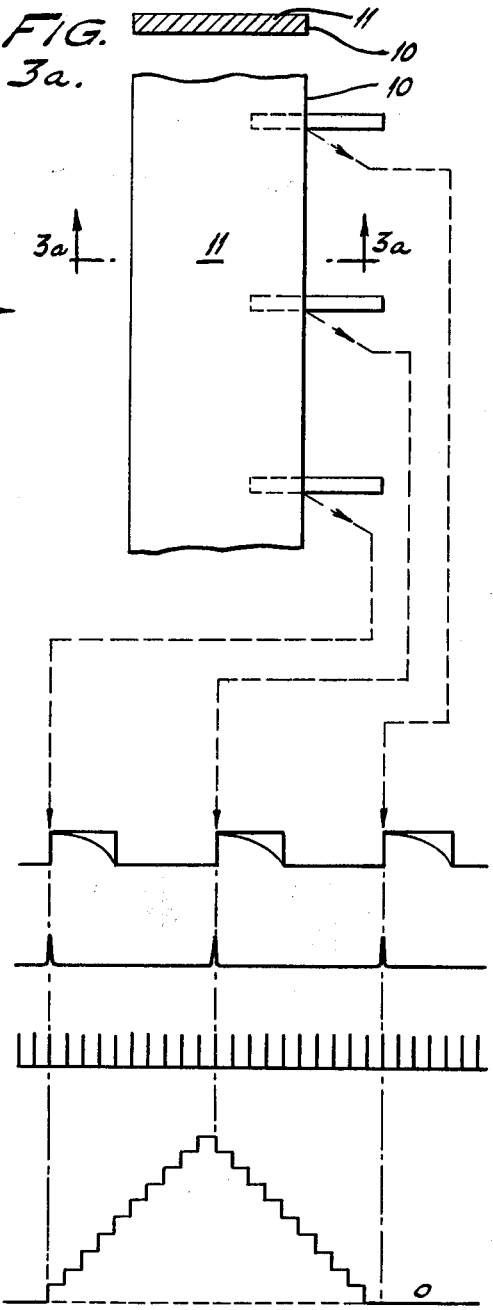
FIG. 2.
FIG. 3.
INVENTORS
GEORGE REVESZ
ALBERT WURZ
BY
ATTORNEY

INVENTORS
GEORGE REVESZ
ALBERT WURZ
BY
ATTORNEY

United States Patent Office 3,495,090
Patented Feb. 10, 1970

3,495,090
CAMBER ANALYZER USING PHOTOCELL SCANNING A PLURALITY OF SUCCESSIVE LIGHT SOURCES
George Revesz, Bala Cynwyd, and Albert Wurz, Souderton, Pa., assignors to Philco-Ford Corporation, Philadelphia, Pa., a corporation of Delaware
Filed Mar. 6, 1968, Ser. No. 710,987
Int. Cl. G01n 21/30; H01j 3/14, 5/16
U.S. Cl. 250—219                        10 Claims

ABSTRACT OF THE DISCLOSURE

A system for determining straightness of a line, particularly to determine the camber of rolled sheet material. The system, which includes an optomechanical scanning device, marker pulse generator, light sources, photoelectric cells, and a counter, measures camber by observing the effect of camber on the straightness of the edge of the moving sheet material. For this purpose the scanning device causes a photo-electric cell to scan this edge, and incident thereto to scan successive light sources underlying this edge. The output of the photocell is utilized to start, reverse and stop the counter. Another photocell and the pulse generator establish reference pulses for the counter.

---

The invention provides new and improved apparatus for such operations as the measurement of camber in rolled sheet material. As is well known to the operators of sheet rolling mills the rolled sheet or strip frequently has camber, that is, non-parallel surfaces or in other words, greater thickness along one edge than along the other edge. Such a condition also causes other irregularities, including curvature of the edges of the rolled sheet or strip, as seen in plan view.

Various photo-electric methods have been tried to determine and measure such curvature, but difficulties have been encountered in the past. It is desirable to determine the condition instantaneously but problems have been encountered as the position of the rolled strip tends to vary, its motion often is irregular, and the illumination under which the measurements are carried out often is subject to fluctuation. We have found a way of improving and expediting such measurement by a scanning and analyzing system that makes novel use of digital count, employing forward and reverse counting procedures. For these purposes we have provided the new apparatus described herein.

Figure 1:
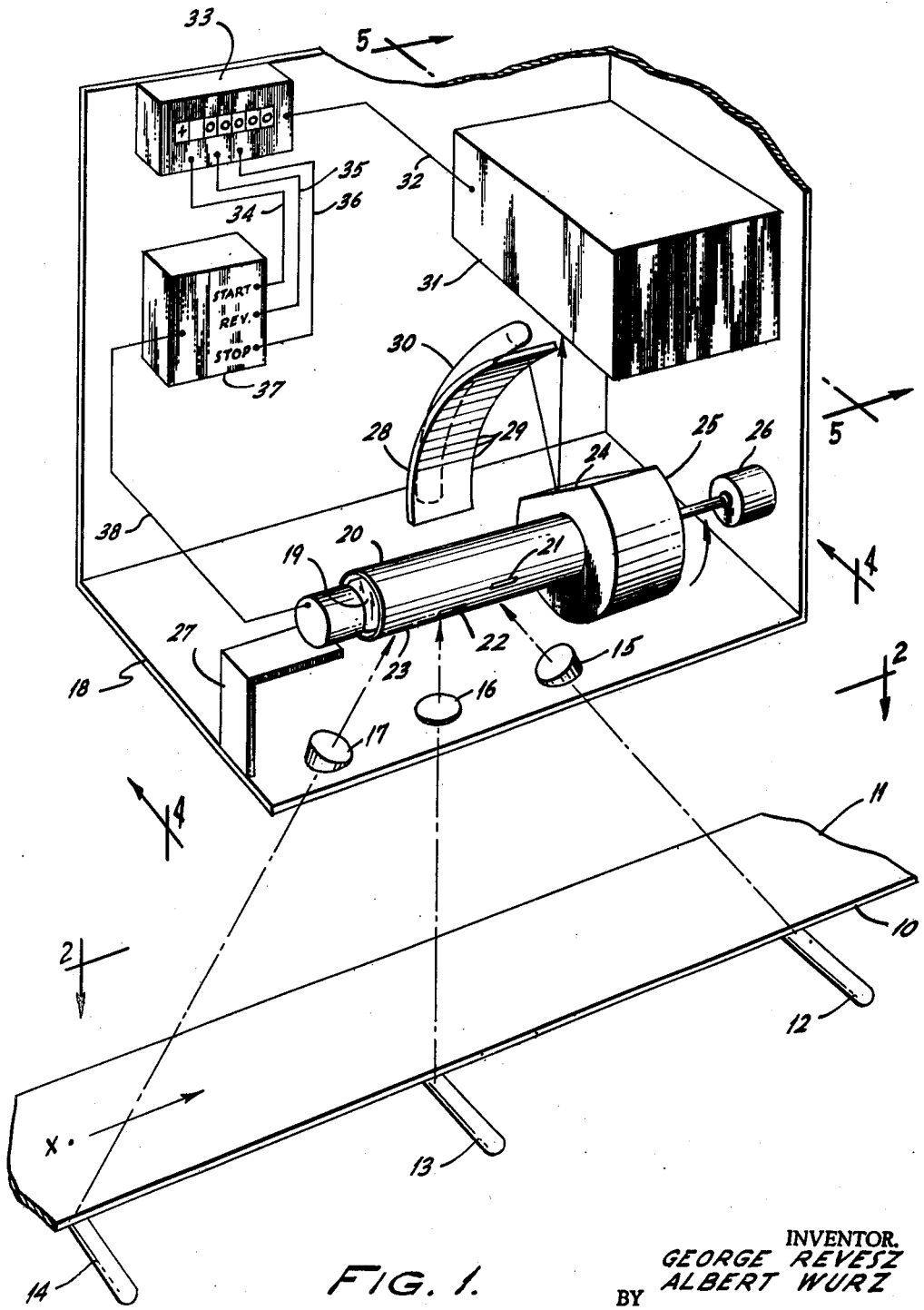

In the drawing FIGURE 1 is a somewhat diagrammatic perspective view of the new apparatus.

FIGURE 2 is a diagram showing part of this apparatus in a view taken along lines 2—2 in FIGURE 1, and also representing certain functions of the apparatus. FIGURE 2a is a sectional view taken along lines 2a—2a in FIGURE 2. FIGURE 3 is a diagram similar to FIGURE 2 but representing a different operative condition, while FIGURE 3a is a sectional view taken along lines 3a—3a in FIGURE 3.

Figure 4:
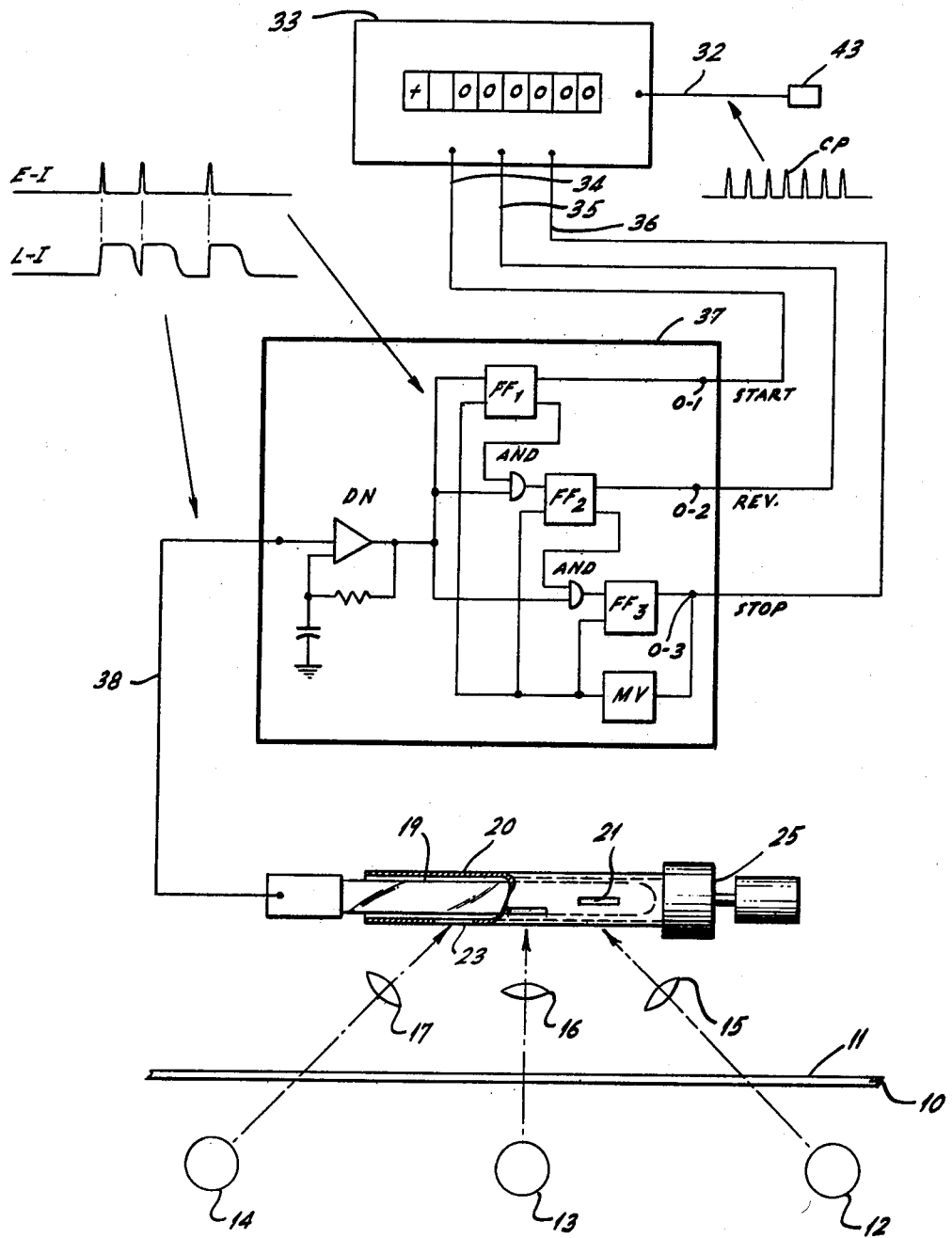

FIGURE 4 provides a schematic showing of circuits and elements in the apparatus, the view being generally along line 4—4 in FIGURE 1.

Figure 5:
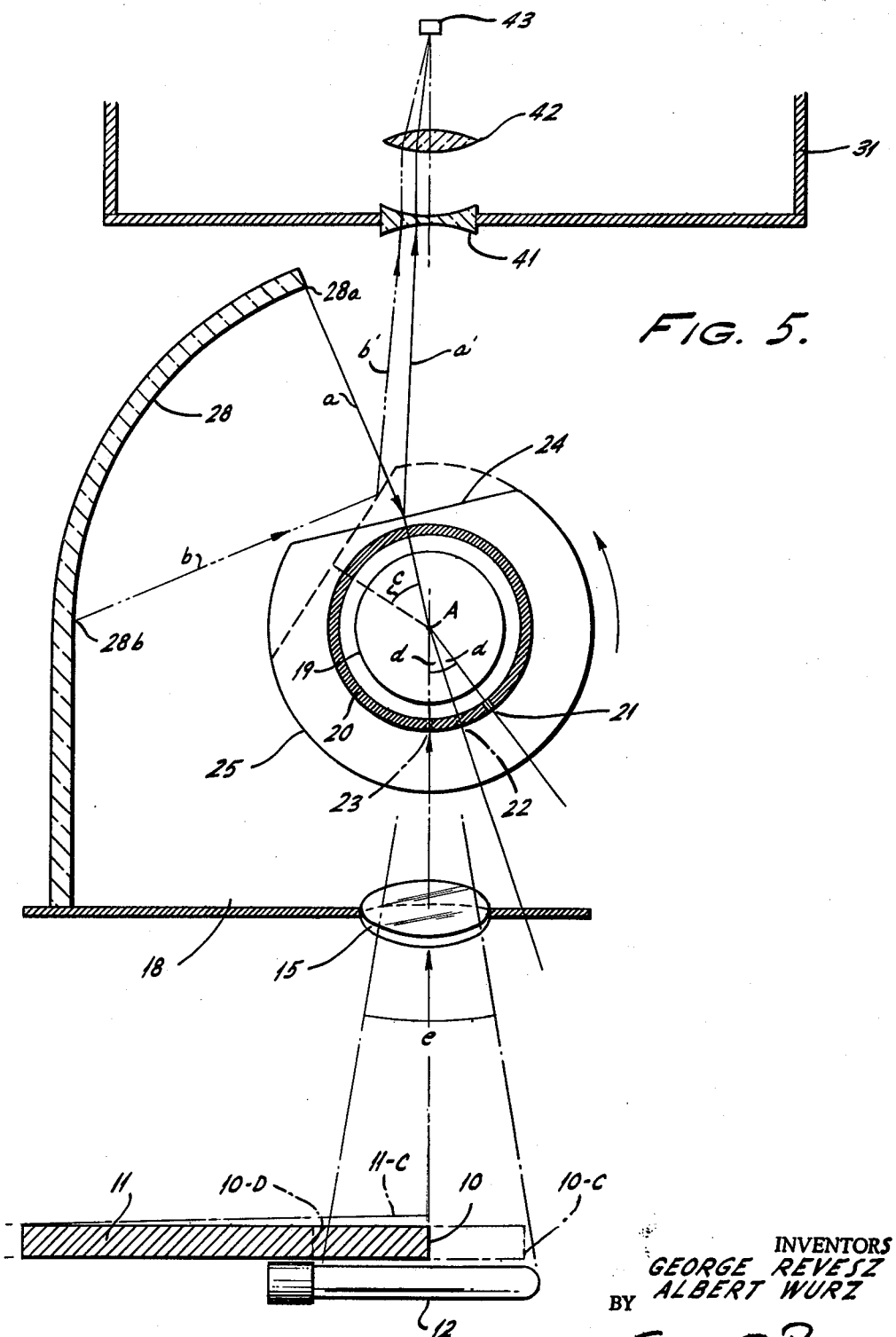

FIGURE 5 is a sectional view, generally taken along line 5—5 in FIGURE 1.

Referring first to FIGURE 1:

According to the invention, the edge 10 of strip 11, to be analyzed for camber and consequent lack of straightness, extends over and across a series of elongate lamps 12, 13, 14, equally spaced along the strip. Part of each lamp underlies the strip and another part of each protrudes beyond edge 10. The lamps constitute first, second and third light sources, which are used, respectively, first to initiate, second to reverse, and third to stop a counting process, to be described presently.

Three lenses 15, 16, 17 are provided in the bottom of a housing 18 suitably mounted above the strip. Each lens is focused on one portion of edge 10, directly overlying one of the three lamps, so that the three lenses transmit, respectively, light from lamps 12, 13 and 14, partly shuttered by the strip. In housing 18, this light enters a gating photocell 19, if and so long as the light is admitted thereto by a further shutter mechanism, comprising a rotatable cylinder 20 which surrounds the photocell and has three slots 21, 22, 23 therein. The slots, as indicated in the drawing, extend along the cylinder at staggered locations, spaced peripherally and longitudinally of the cylinder. Each slot is so disposed that on rotation of the cylinder it periodically comes into a position where it intercepts one of the straight lines of sight from lamps 12, 13 or 14 through the corresponding lenses 15, 16 or 17. The slotted cylinder, together with a reference mirror 24 on a flat peripheral surface of a disc 25, is rotated by a motor 26, the axis of rotation being central to the disc and cylinder and being generally parallel to strip 11. Photocell 19 is held by bracket 27.

The mirror, just mentioned, is disposed opposite a reference scale 28 which has divisions 29 extending generally parallel to the axis of photocell 19. Desirably this scale is transparent and is illuminated from its reverse side by an elongate lamp 30. Both lamp and scale are shown as being curved arcuately about the axis of rotation of disc 25. The rotating mirror projects successive images of scale divisions 29 into a photoelectric reference unit 31, to be described hereinafter, and the output line 32 of this unit provides electric marker or reference pulses to a display counter 33, the pulses corresponding to these projected images.

This counter also receives, through lines 34, 35, 36, repeated sequences of three electric pulses. The first, second and third pulses of each sequence are derived, respectively, from the first, second and third systems of lamp, lens and slot (for instance, the first or starting pulse, transmitted through line 34, is derived from light of lamp 14, received through lens 17 and slot 23). This is done by means of control operations in gate circuit unit 37, triggered by gating photocell 19 through control line 38.

It will be understood that the control lines 32, 38, and associated circuits, are shown in simplified form. The actual arrangement of such apparatus is well known to persons skilled in the art and need not be described further.

Strip 11 can be in motion, for instance in the direction indicated by the arrow at point X, or it can be at rest. Motor 26 revolves gate cylinder 20 at a speed which is rapid, in a way to be explained presently, in comparison with any expected or actual motion of the strip. In the rotation of cylinder 20, as already indicated, slots 21, 22, 23 successively admit light from the exposed portions of the respective lamps to the gating photocell. For present purposes we call the speed at which the three successive lamps are thus exposed to the photocell, the functional speed of the mechanism. This functional speed should exceed, and advantageously far exceed, the speed of any motion of strip 11, as it is among the purposes of the apparatus to inspect the form of a strip edge portion, extending from lamp 12 to lamp 14, in substantially instantaneous fashion and substantially without confusion due to strip motion.

In FIGURES 2 and 2a the inspected portion 11-C of a generally flat strip 11 is shown as being cambered, the right edge 10-C of this portion being thicker than the opposite edge (FIGURE 2a) and this opposite edge tending to be longer, so that the strip portion 11-C is distorted into a form which, in plan view as shown, is concave to the right (FIGURE 2). The straightness or curvature of the edge is digitally indicated and measured in display counter 33 by the following sequence of actions, schematically suggested in FIGURES 2 and 4.

Through the rotating cylinder and slit mechanism 20 to 23 (FIGURE 4), gating photocell 19 scans along edge 10 to look in rapid succession at lamps 12, 13, 14. It receives successive light impulses from these successive lamps, as is graphically shown by line L–1 (FIGURE 2). During each impulse the light-admitting slot, as seen by the photocell, scans along the corresponding elongate lamp in a direction across the edge 10–C to be observed, as is suggested by the horizontal arrow at 20 in FIGURE 2. While a slot so scans for instance along lamp 13, as suggested here, no light from the lamp is picked up initially, as a portion of the lamp is covered by strip 11. The lamp becomes visible to the photocell at a point 13–X, to the right of the front end of the slot's travel over the lamp area. When the lamp becomes visible to the phototube, at 13–A, a corresponding rise 13–Y occurs in the light input of the photocell, initiating light impulse 13–Z. Corresponding points 12–X and 14–X for strip-shuttered areas of the other lamps are differently spaced along line L–1 due to curvature of edge 10–C, thereby causing corresponding light impulses 12–C, 14–C which have different initial timing, 12–Y, 14–Y. The precise time intervals between the beginnings of such impulses depend on the presence and character of edge curvature 10–C. For comparison, in the case of FIGURES 3, 3a where strip 11 is not cambered and curve-edged, the successive impulses have uniform initial timing and are uniformly spaced, one from the other, within each sequence of three impulses.

For purposes of the present invention only initial parts 12–Y, 13–Y, 14–Y of the light impulses are significant. Duration and amplitude of each impulse are irrelevant. In fact, the remainder of each impulse would tend to be confusing and detrimental, if retained, as is explained below. In order to utilize only the initial portions of the impulses, and their mutual spacing, circuit unit 37 (FIGURE 4) includes a differentiating network DN which can be of well known construction per se and which, when it receives the output of gating photocell 19 through line 18, creates narrow electric pulses 12–U, 13–U, 14–U (FIGURE 2), each coinciding with the start of a longer light pulse incident on the photocell.

The counter, under control from the reference unit, then counts increments of time, for instance milliseconds, elapsing from the first or count-starting pulse 12–U to the second or count-reversing pulse 13–U, whereafter it counts similar increments in reverse direction to the last or count-stopping pulse 14–U. Advantageously these pulses are obtained by means of mirror 24, rotating with the slotted cylinder. For these purposes the marker or reference unit, with the help of devices to be described later, establishes counting pulses CP. From start to reversal of the count each pulse CP causes one forward count +C in the counter. It is believed unnecessary to show the circuitry and mechanism which utilize the counting pulses CP, arriving in line 32, for controlling counter 33 (FIGURE 4), these arrangements being well known to the art.

The output of differentiating network DN in control circuit 37 forms the input of a system of flip-flop units FF–1, FF–2, FF–3 interconnected by AND gates. From this fact, and its representation in the drawing, it will be obvious to persons skilled in the art that output terminals 0–1, 0–2, 0–3 of the three flip-flops are successively energized during each series of three photo-electric pulses. The first of these terminals (0–1) is energized through flip-flop FF–1 on arrival of a first gating pulse 12–U, the second (0–2) through FF–2 on arrival of the second or middle gating pulse 13–U, and the third and last (0–3) through FF–3 on arrival of the last gating pulse 14–U of the series. At the latter time a multivibrator MV resets the flip-flops for the next series of pulses. The energizations of circuit unit 37, at the output terminals, are successively transmitted by count-starting, reversing and stopping lines 34, 35, 36, respectively, to counter 33 wherein they serve, in a way known per se, to start, reverse and stop the utilization of counting pulses CP, arriving from the reference unit through line 32. Thus it will be seen that during each series of control operations, initially forward count +C (FIGURE 2) occurs in the counter, followed by negative or reverse count —C, whereupon the counting stops for a short time. If the durations of forward and reverse counts are equal, FIGURE 3, the net count of display counter is zero, as indicated. If the reverse count —C exceeds the forward count, FIGURE 2, a negative balance of counts, for instance —4, is accumulated as shown, or in the opposite case a positive balance will be shown. It will be understood that these positive, zero and negative counts signify respectively rightward convexity, straightness, or rightward concavity of the strip, thereby indicating the presence or absence of different kinds of camber in the strip.

As already noted, only the location of the start of each light pulse 12–Z, 13–Z, 14–Z and the corresponding location of each momentary gating pulse 12–U, 13–U, 14–U is significant for present purposes. Other characteristics of such a light pulse, including amplitude and duration, are immaterial for present purposes, or may even tend to confuse the count, if they are not eliminated. For instance due to the geometry of the light source and the lens and slot system, the photocell may receive light either of constant brightness throughout each pulse, as indicated by the rectangular wave shape in line L–1, or subject to various types of modulation as is generally indicated by the curved branches of line L–1. Difficulty would be encountered if photocell 19 had to account for such variations. The arrangement is such that the photocell accounts only for the presence or absence of a momentary pulse 12–U, 13–U and 14–U.

However, the duration of light pulses 12–Z etc. is significant in that a first pulse must terminate before a second pulse begins. Otherwise the photocell would respond only to a single, extended pulse, not a plurality of pulses. In addition, a certain relationship must exist between the duration of sequences of reference and gating pulses. These several relationship can be further explained as follows, referring to FIGURE 5.

The lines of sight from edge 10 through the lenses to photocell 19 are successively traversed by slots 21, 22, 23, while mirror 24 faces different successive portions of scale 28, located between terminal positions 28a, 28b of this scale. The locations of these different scale positions and the successive positions of the mirror are such that successive scale portions and divisions are mirrored into reference unit 31, as is indicated by arrows a, a' and b, b'. The positions of mirror 24, corresponding to the terminal mirroring operations, are angularly displaced one from the other by an angle c, in the counter-clockwise rotation of the unit shown by the arcuate arrow. Throughout the time interval corresponding to angle c, reference marks from scale 28 are projected into reference unit 31. During a mere part—desirably a major part—of this time interval gating pulses are generated in photocell 19.

For this latter purpose, slots 21, 22 on cylinder 20 are angularly spaced from one another by angle d and slots 22, 23 are spaced by an equal angle d. The total angular extent 2d of the slotted portion of the cylinder is slightly less than the aforementioned angle c, thus making sure that reference pulses are available throughout the gating operation.

Referring next to the lower part of FIGURE 5 it will be seen that lamp 12 spans an angle e which is such that all light from the lamp can reach photocell 19, through lens 15, said angle e being smaller than angle 2d, and desirably even smaller than angle d, in order that the rotating slot structure will cut off light from one lamp 12 before light from an adjacent lamp can begin to arrive. An approximately normal position of the edge of strip 11 is shown at 10, and it will be understood that the edge generally remains at such position if the strip is without camber. The gating system compares different successive measurements of portions of angle e, uncovered by flat strip 11 or cambered strip 11–C.

Meanwhile divisions on scale 28 are projected into reference unit 31. Desirably, the scale is of a finely-divided type, such as a Ronchi grating, having more than a thousand lines per inch. The scale and its lamp may be curved, as shown, or may be arranged in other ways and forms, known to persons skilled in this art. Light from the lamp passes through this scale to rotating mirror 24, and is reflected by this mirror. The light then arrives in the reference unit, along different paths dependent on the different locations of the scale divisions seen by the mirror. The different light beams, for instance a', b', are collimated by a suitable objective 41, and are then focused by a further optical element 42 into a photo-electric unit, schematically shown at 43. This unit, as indicated in FIGURE 4, furnishes the control pulse markings CP for the differential counting procedures illustrated in FIGURES 2 and 3 and characterizing this invention.

We claim:

1. In a system for the determination of curvature characteristics of a line: a photosensitive element arranged in registry with the line; a series of elongate light sources, one spaced from the other along the line and each extending across the line; a scanning system between the photosensitive element and the line, said system being arranged to scan successive portions of the line disposed adjacent the several light sources; and means for measuring and comparing time intervals between the scannings of said successive line portions, whereby to determine said curvature characteristics.

2. In a system as described in claim 1, pulse generator means for providing reference pulses to perform said measuring and comparing of time intervals by pulse-counting procedures.

3. In a system as described in claim 2, unitary rotor means comprising parts of said scanning system and of said pulse generator means.

4. A system for determining camber in a strip of sheet material, said system including: photocell means for observation of an edge of the strip; a series of elongate lamps extending across the edge; scanning apparatus cooperable with the edge to expose the photocell means sequentially to light from portions of the several lamps, and thereby to determine the locations of the lamps relative to the edge; and means for measuring the time intervals between the moments when the photocell means is first exposed to each elongate lamp by the strip and the scanning apparatus.

5. A system as described in claim 4 additionally including a series of focusing lenses, one lens for each of said lamps, each lens being focused on the photocell means and on a portion of the strip overlying one of the lamps.

6. A system as described in claim 4 wherein the scanning apparatus includes a rotatable hollow cylinder surrounding the photocell means and extending in an axial direction generally parallel to the strip, said cylinder having staggered apertures for exposing the photocell to the lamps.

7. A system as described in claim 6 also including an optical element coaxial and rotatable with said hollow cylinder, and reference means to generate marker pulses for said measuring means with the aid of said optical element.

8. Apparatus for analyzing a line or the like, for instance for determining straightness of an edge of a rolled sheet as affected by camber, said apparatus comprising: a first photocell unit and a unit of parallel elongate light sources, said units being arranged so that the line to be analyzed can be caused to extend between them, across the elongate light sources; a second photocell unit and a scale; a scanning and reference system arranged to expose said first photocell unit sequentially to points of the line adjacent the several light sources and to expose the second photocell unit sequentially to divisions of said scale; and means for determining time intervals between the moments when the first photocell unit is exposed to said points, with the aid of timing pulses derived from said divisions by the second photocell unit.

9. Apparatus as described in claim 8 wherein the scaning and reference system has a cylindrical rotor surrounding the first photocell unit and having a series of slots therein for said scanning, and also has a member coaxial with said rotor for exposing the second photocell unit to said scale during part of the rotor's rotation, said part having an angular extension slightly greater than the total angular spacing of said slots.

10. Apparatus as described in claim 9 wherein said elongate light sources extend over distances which define angles with respect to the rotor, smaller than the angular extent of the series of slots on the rotor.

References Cited

UNITED STATES PATENTS

| | | | |
|---|---|---|---|
| 3,232,547 | 2/1966 | Thiede et al. | 250—219 |
| 3,432,672 | 3/1969 | Bessonny et al. | 250—219 |

ARCHIE R. BORCHELT, Primary Examiner

MARTIN ABRAMS, Assistant Examiner

U.S. Cl. X.R.

250—202, 236, 237